US012617956B2

(12) United States Patent
Illsley

(10) Patent No.: US 12,617,956 B2
(45) Date of Patent: May 5, 2026

(54) AQUEOUS INKJET COMPOSITIONS COMPRISING HYDROXY-FUNCTIONAL POLYURETHANE DISPERSIONS

(71) Applicant: SUN CHEMICAL CORPORATION, Parsippany, NJ (US)

(72) Inventor: Derek Illsley, Bath (GB)

(73) Assignee: SUN CHEMICAL B.V., Weesp (NL)

( * ) Notice: Subject to any disclaimer, the term of this patent is extended or adjusted under 35 U.S.C. 154(b) by 329 days.

(21) Appl. No.: 18/026,543

(22) PCT Filed: Mar. 31, 2022

(86) PCT No.: PCT/GB2022/050814
§ 371 (c)(1),
(2) Date: Mar. 15, 2023

(87) PCT Pub. No.: WO2022/208096
PCT Pub. Date: Oct. 6, 2022

(65) Prior Publication Data
US 2023/0365823 A1 Nov. 16, 2023

Related U.S. Application Data

(60) Provisional application No. 63/169,362, filed on Apr. 1, 2021.

(51) Int. Cl.
| | |
|---|---|
| *C09D 11/38* | (2014.01) |
| *B41F 5/24* | (2006.01) |
| *B41F 15/00* | (2006.01) |
| *B41J 2/01* | (2006.01) |
| *B41M 5/50* | (2006.01) |
| *C09D 5/02* | (2006.01) |
| *C09D 7/63* | (2018.01) |
| *C09D 11/102* | (2014.01) |
| *C09D 11/322* | (2014.01) |
| *C09D 175/04* | (2006.01) |
| *C08K 5/17* | (2006.01) |

(52) U.S. Cl.
CPC .............. *C09D 11/102* (2013.01); *B41F 5/24* (2013.01); *B41F 15/00* (2013.01); *B41J 2/01* (2013.01); *B41M 5/502* (2013.01); *C09D 5/02* (2013.01); *C09D 7/63* (2018.01); *C09D 11/322* (2013.01); *C09D 11/38* (2013.01); *C09D 175/04* (2013.01); *C08K 5/17* (2013.01)

(58) Field of Classification Search
CPC .......... C09D 11/102; C09D 5/02; C09D 7/63;
C09D 11/322; C09D 11/38; C09D 175/04; B41F 5/24; B41F 15/00; B41J 2/01; B41M 5/502; C08K 5/17
See application file for complete search history.

(56) References Cited

U.S. PATENT DOCUMENTS

| | | | |
|---|---|---|---|
| H2113 H | 1/2005 | Nichols | |
| 7,476,705 B2 | 1/2009 | Pajerski | |
| 7,875,355 B2 | 1/2011 | Rouge et al. | |
| 7,947,760 B2 | 5/2011 | Janmaat et al. | |
| 8,186,822 B2 | 5/2012 | Li et al. | |
| 8,568,889 B2 | 10/2013 | Pajerski | |
| 8,931,889 B2 | 1/2015 | Roberts | |
| 9,249,324 B2 | 2/2016 | Li et al. | |
| 9,255,207 B2 | 2/2016 | Berge et al. | |
| 10,457,824 B2 | 10/2019 | Kuykendall | |
| 10,513,622 B2 | 12/2019 | Falkner et al. | |
| 2004/0102542 A1* | 5/2004 | Pears ..................... | C08G 18/38 |
| | | | 523/160 |
| 2007/0060670 A1 | 3/2007 | Ellis | |
| 2007/0067928 A1* | 3/2007 | Ellis ................... | D06P 1/67333 |
| | | | 8/445 |
| 2010/0105710 A1 | 4/2010 | Murakawa et al. | |
| 2011/0076486 A1* | 3/2011 | McGee .................. | B32B 5/147 |
| | | | 524/502 |
| 2014/0275394 A1* | 9/2014 | Allen ................. | C09D 133/066 |
| | | | 524/507 |
| 2018/0105710 A1 | 4/2018 | Hong et al. | |
| 2020/0308338 A1 | 10/2020 | Tanaka et al. | |

FOREIGN PATENT DOCUMENTS

| | | | | |
|---|---|---|---|---|
| CN | 1572849 A | * | 2/2005 | ......... C08G 18/0823 |
| CN | 103 865 365 A | | 6/2014 | |
| CN | 111138626 | | 5/2020 | |
| JP | 2011 252122 A | | 12/2011 | |
| WO | WO2009/137753 | | 11/2009 | |

OTHER PUBLICATIONS

International Search Report issued in International Application No. PCT/GB2022/050814, mailed Jun. 22, 2022.
Written Opinion of the International Searching Authority issued in International Application No. PCT/GB2022/050814, mailed Jun. 22, 2022.
Written Opinion of the International Preliminary Examining Authority issued in International Application No. PCT/GB2022/050814, mailed Feb. 14, 2023.

* cited by examiner

*Primary Examiner* — Yaovi M Ameh
(74) *Attorney, Agent, or Firm* — Howard C. Lee

(57) ABSTRACT

Ink and coating compositions, including inkjet inks, comprising a blend of OH-PUDs having hydroxyl values preferably greater than 25, and more preferably greater than 50 mgKOH/g, with PUDs having hydroxyl values of less than 25, and more preferably less than 5 mgKOH/g.

24 Claims, No Drawings

AQUEOUS INKJET COMPOSITIONS COMPRISING HYDROXY-FUNCTIONAL POLYURETHANE DISPERSIONS

CROSS REFERENCE TO RELATED APPLICATIONS

The present application is a § 371 National Phase application based on PCT/GB2022/050814 filed Mar. 31, 2022, which claims the benefit of U.S. Provisional Application No. 63/169,362, filed Apr. 1, 2021, the subject matter of each of which is incorporated by reference in their entirety.

FIELD OF THE INVENTION

The present invention relates to ink and coating compositions, and specifically inkjet ink compositions, comprising polyurethane dispersions, which have a desirable combination of both good resolubility and good print resistance.

BACKGROUND OF THE INVENTION

Polyurethane Dispersions (PUDs) are a widely used resin used in the preparation of pigmented aqueous inkjet printing inks. One problem with using PUDs in aqueous inkjet ink compositions is that upon drying, such as at temperatures of up to 40° C. for between 15 and 60 minutes, they become insoluble and cannot then be resolubilized in either the ink itself or a flushing solution.

Hydroxyl-Functional PUDs (OH-PUDs) and their use in inkjet inks are known in the art and, due to the presence of the hydroxyl functionalization, provide compositions with improved resolubility/redispersibility when OH-PUDs are incorporated. This is especially useful for aqueous inkjet printing inks; wherein insoluble inks cause clogging of the printhead. However, incorporating OH-PUDs can be detrimental to properties of ink and coating compositions such as water resistance, as the improved resolubility means that the dried films can be quickly eroded with water.

U.S. Pat. No. 8,931,889B2 discloses OH-PUDs comprising polyether diols as part of their chemical structure and their use in aqueous inkjet ink compositions. U.S. Pat. No. 8,931,889B2 discloses OH-PUDs with improved stability and long nozzle life. CN111138626 discloses PUDs for aqueous inkjet printing of textiles, wherein end-capping reagents such as N-methylethanolamine are used to prepare OH-PUDs (hydroxy-terminated). Indeed, the use of end-capping agents in the preparation of OH-PUDs is well known in the art. For example, U.S. Pat. No. 7,875,355B2 discloses OH-PUDs for use in the automotive coating industry, prepared using a diaminopropanol end-capping reagent.

US2010105710 discloses that OH-PUDs can reduce printhead clogging; improvements that likely result from the improved resolubility of the inks due to incorporation of OH-PUDs.

To mitigate the reduction in water resistance that results from the inclusion of OH-PUDs, the PUDs can be cross-linked. Aqueous inkjet printing inks comprising PUDs can be crosslinked using a variety of crosslinking agents and, including amino resins such as melamine-formaldehydes. A number of crosslinking methodologies are disclosed in the art for polyurethanes comprising carboxylic acid, hydroxyl, or amine pendant functional groups, using crosslinkers such as carbodiimides, epoxies, isocyanates, amino resins (e.g. melamine-formaldehyde), and aziridines. Crosslinking PUDs is especially important in the printing of textiles.

WO2009/137753 discloses crosslinking of PUDs with Cymel 303, a melamine-formaldehyde crosslinker, at a temperature of 160° C. U.S. Pat. Nos. 10,513,622, 10,457,824, and 9,249,324 disclose the use of optional crosslinkers in combination with polyurethane pigment dispersants to improve resistance properties. U.S. Pat. Nos. 8,186,822, 9,255,207 and US20070060670 disclose aqueous inkjet ink compositions comprising crosslinked PUDs. The cross-linked PUDs are produced by crosslinking during the preparation of the PUD, using a crosslinking reagent such as triethylene tetraamine.

U.S. Pat. Nos. 8,568,889B2 and 7,476,705 disclose the preparation of self-crosslinking PUDs comprising the keto-hydrazide crosslinking chemistry, from diol prepolymers formed through a reaction of diepoxides with levulinic acid. US20180105710 discloses the use of a crosslinker (a carbodiimide is used in the examples) to improve print resistance of a OH-PUD-containing composition, which would otherwise be poor due to the inclusion of OH-PUD.

Print resistance has been achieved for OH-PUDs using crosslinkers such as carbodiimides, oxazolines, amino resins (such as melamine formaldehydes), blocked isocyanates and zirconium complexes (see, e.g. US20180105710). However, while the use of crosslinking agents improves the water resistance of OH-PUD containing inks and coatings, it can negatively impact ink resolubility. Furthermore, crosslinking agents such as amino resins, blocked isocyanates, carbodiimides, oxazolines and the like, can cause health issues, particularly for inks and coatings used in the printing of food packaging, pharmaceutical packaging, personal care packaging, personal care products (such as baby nappies) and other sensitive applications.

The literature has not adequately shown how it is possible to produce aqueous inks, especially inkjet inks, with excellent resolubility/redispersibility, which at the same time can produce prints with excellent water resistance.

The inventors have addressed this problem in the art and developed a new ink or coating composition comprising OH-PUDs that has both excellent resolubility and good water resistance. Furthermore, the water resistance properties of the ink or coating compositions of the invention are achieved without the use of crosslinking agents or the need for high boiling co-solvents in an amount above 30 wt %.

SUMMARY OF THE INVENTION

The present invention provides ink or coating compositions with good resolubility, which prevents the irreversible drying of inks in a printhead that can lead to blocked nozzles and a consequent loss in print quality performance or, even worse, the loss of the printhead itself. The inks or coatings of the invention also cure after printing and drying to produce water resistant prints. The invention achieves this without the use of high concentrations of high boiling point co-solvents, such as glycerol and propylene glycol. Indeed, the inks or coatings of the invention maintain good resolubility/redispersibility with propylene glycol concentrations as low as 15% (w/w) of the ink composition. The inks and coatings of the invention are particularly suited for inkjet printing, where resolubility is required as well as fast cure speed.

The present invention provides an aqueous ink or coating composition comprising a first hydroxyl-functionalised polyurethane dispersion having a hydroxyl value of 25 mgKOH/g or greater, and a second polyurethane dispersion having a hydroxyl value of less than 25 mgKOH/g.

The present invention further provides a printed article comprising a substrate comprising a cured layer of the ink or coating according to the invention.

The invention further provides a method of printing the ink of the invention comprising the steps of a) providing the ink or coating composition of the invention; and b) printing said composition onto a substrate.

The invention also provides a method of resolubilizing a cured layer of the ink or coating of the invention, comprising the steps of a) provided a substrate comprising a dried and cured layer of the composition of the invention; and b) resolubilizing the dried and cured layer.

The invention further provides the use of the ink or coating of the invention in a method of printing, as well as the use of a composition of the invention to increase the resolubility of a dried film obtained from coating said composition onto a substrate.

None of the above prior art references discloses or suggests to combine OH-PUDs (i.e. PUDs having a hydroxyl value equal to or above 25 mg KOH/g) with PUDs of low hydroxyl value (i.e. less than 25 mgKOH/g, and more preferably less than 5.0 mgKOH/g) to produce inks having excellent resolubility as well as delivering good print resistance. Furthermore, aqueous inkjet and flexo inks comprising a combination of OH-PUD with self-crosslinking PUDs have not been disclosed.

None of the above prior art references discloses inks according to the present invention, where OH-PUDs are blended with low hydroxyl value (OHV) PUDs, which may optionally be self-crosslinkable. The use of crosslinkers, as disclosed in the art, is an optional feature of the present invention.

DETAILED DESCRIPTION

The invention is further defined by the following detailed description.

Definitions

Self-crosslinking polymers. Self-crosslinking polymers contain a functionality which is self-reactive, and thus do not require the use of a separate co-reactant per se. A self-crosslinking polymer is usually in the form of an aqueous dispersion or emulsion and is typically the product of at least two monomers that react with one another. For example, such a polymer may contain both a carbonyl and an amine functional group. There are several mechanisms by which a polymer can be self-crosslinking. Alternatively or in addition, self-crosslinking polymer emulsions can comprise crosslinkable functional groups attached to the polymer backbone in addition to a crosslinker (i.e. a polyfunctional species that reacts with said crosslinkable functional groups). Typically, in self-crosslinking polymer chemistry, polymers containing ketone groups crosslink at room temperature when combined with bi- or polyfunctional compounds that are reactive towards carbonyl. One example of these reactive compounds is bishydrazides. Such self-crosslinking PUDs are provided as one pack products.

The self-crosslinking reaction may also be initiated by the evaporation of water upon drying, a change of pH of the vehicle, or by curing at elevated temperatures, at which the cross-linking reaction occurs faster, or the reactive groups are de-blocked. In a preferred embodiment, the self-cross-linking polymers used in the present invention undergo self-crosslinking at room temperature (e.g. 25° C.). In other words, self-crosslinking polymers and polymer emulsions are species that undergo crosslinking when initiated by one of the above-mentioned methods, but otherwise can be stored long-term in a stable state without undergoing significant crosslinking. Self-crosslinking polymers and polymer emulsions do not require mixing with a crosslinking agent in order to undergo crosslinking.

Boiling point=unless otherwise specified, all boiling points are measured under standard atmospheric pressure of 101 kPa.

(w/w)=mass of component as a percentage of the total mass of the composition.

Hydroxyl Value (OHV): This is defined as the number of milligrams of potassium hydroxide required to neutralize the acetic acid taken up on acetylation of one gram of a chemical substance that contains free hydroxyl groups. The standard procedure as defined in ISO 4629-1:2016(E) is used to determine the Hydroxyl value. Hydroxy value and hydroxyl value are used interchangeably.

Acid Value (AV): The mass of potassium hydroxide (KOH) in milligrams that is required to neutralize one gram of chemical substance. Unless stated otherwise, reference to the acid value is to the total acid value and is suitably measured in accordance with ISO 2114:2000(E) (method B) standard.

Resolubility/Redispersibility: This is a feature of the inks of the invention and is the ability of a partially or fully dried ink to redissolve or redisperse back into the ink fluid or a suitable flushing solution. For inkjet applications this is a most desirable property, as it reduces the risks associated with inks becoming irreversibly dried in the nozzles of an inkjet printhead. The inventors have shown, by way of a simple test, that inks prepared according to the invention have excellent resolubility.

The Heat of Vaporization: The amount of energy (enthalpy) that must be added to a liquid substance to transform a quantity of that substance into a gas. For the purposes of the present disclosure, the enthalpy of vaporization is given at the normal boiling temperature of the substance in questions, wherein the normal boiling temperature is the boiling point of a substance at one atmosphere pressure.

Ink and Coatings of the Invention

The present invention provides aqueous inkjet inks comprising a blend of a hydroxy-functionalised PUD (OH-PUDs) having hydroxyl values of 25 mg KOH/g or greater with PUDs having low hydroxyl value, such as less than 25 mgKOH/g, or less than 5 mgKOH/g. The ink or coating compositions of the present invention have excellent resolubility/redispersibility and at the same time produce prints with excellent water resistance.

Resolubility and Water Resistance

Resolubility of an ink or coating is the capacity of a partially or fully dried ink to redissolve/redisperse into itself or a suitable flushing solvent. It is a key property for inkjet inks, as it ensures that the ink does not become irreversibly dried onto a printhead, which can cause blockage of the printhead nozzles. Blockage of nozzles can cause print defects or, in the worst case, catastrophic loss of the printhead itself. This is a particularly important property for inkjet inks.

Resolubility/redispersibility, in the context of this invention and inkjet more broadly, is defined as the ability of an ink dried at temperatures of up to 40° C., and even 50° C., for up to one hour, to re-dissolve, or redisperse, into itself or a suitable 'flushing' solution. Flushing solutions are used to clean printheads in order to dissolve any ink residues and are used when the nozzles of a printhead become partially blocked, or in order to remove the majority of the prior ink before loading a new ink into the printhead. Typical flushing solution for printheads using aqueous inkjet inks include blends of water, co-solvents, surfactants, and a base such as triethanolamine. Preferably, the flushing solution comprises the same components as present in the ink it is cleaning from the nozzle.

Use of OH-PUDs having hydroxyl values≥25 mgKOH/g, and more preferably ≥50 mgKOH/g, on the dry polymer weight can produce inkjet inks with exceptional resolubility. However, when these inks are printed onto substrates such as plastic films, or coated metal substrates, the water resistance of dried prints is poor. In contrast, PUDs with hydroxyl values of 25 mgKOH/g, or less, produce dry prints with excellent water resistance but with very poor resolubility.

The water resistance of inks and coatings comprising OH-PUDs having hydroxyl values≥25 mgKOH/g, and more preferably ≥50 mgKOH/g can be improved through cross-linking. However, this results in a reduction in the resolubility. Furthermore, typical crosslinking agents of the art are unsuitable for use in sensitive applications, as they can migrate out of the cured layer and contaminate substances contacting the cured layer, for example, food stuffs in food packaging.

The present invention solves this problem of the art by blending a OH-PUD having a hydroxyl values of 25 mgKOH/g or greater, and preferably greater than 50 mgKOH/g, with PUDs having hydroxyl values of less than 25 mgKOH/g. The introduction of the OH-PUD having a hydroxyl value of 25 mgKOH/g or greater improves the resolubility/redispersibility of the inks, whilst the presence of the PUD having a hydroxyl value of less than 25 mgKOH/g allows the compositions to cure, after printing and drying, to produce water resistant prints. It is the combination of OH-PUDs and PUDs as required by the claimed invention that provides aqueous printing inks, especially aqueous inkjet printing inks, with this desirable combination of properties.

Hydroxyl-Functional PUDs

The OH-PUD for use in the present invention has a hydroxyl value, based on the dry weight of the polymer, of 25 mgKOH/g or greater, preferably 30 mgKOH/g or greater, such as 40 mgKOH/g or greater, and more preferably 50 mgKOH/g or greater. The OH-PUD for use in the present invention may have a hydroxyl value of 70 mgKOH/g or greater, or 100 mgKOH/g or greater.

The examples of the invention demonstrate how increasing the hydroxyl value of the OH-PUD improves the resolubility of the resulting ink. Without wishing to be bound by theory, it is postulated that this improvement results from the increased hydrophilicity of OH-PUDs having more hydroxyl groups as part of their structure. Thus, it is preferred that the hydroxyl value of a OH-PUD is greater than 25, and more preferably greater than 50, based on the dry polymer weight.

The OH-PUDs for use with the invention have pendant hydroxyl groups and can be prepared by methods known in the art. The high hydroxyl values of the OH-PUDs for use in the present invention (i.e. greater than 25 mgKOH/g (based on the dry polymer weight)) can be achieved by using an excess of diol, compared to diisocyanate, in the polyurethane preparation to produce a hydroxyl-terminated OH-PUD. High hydroxyl values can also be obtained by using a hydroxyl-functional chain-terminating species, such as ethanolamine and diethanolamine, where the amine reacts preferentially with isocyanate of the prepolymer to end-cap the polyurethane with a OH-containing group to produce the desired OH-PUD. For the purposes of the present invention, it is not important how the OH-PUD is prepared, provided it meets the requirements of the invention for the hydroxyl value and enables a resoluble/redispersible ink or coating to be prepared.

The OH-PUD for use in the present invention may be either an anionically or non-ionically stabilized dispersion, or a combination of the two stabilization mechanisms. Anionically stabilized OH-PUD dispersions comprise acid groups as part of its polymeric structure, which after neutralization with a suitable base provide anionic stabilization enabling aqueous dispersion of the resin. Where the PUDs are anionically stabilized, it is preferred that the acid value, based on the dry polymer weight, should be at least 10, and more preferably at least 20 mgKOH/g.

Anionic OH-PUDs are commonly produced by the inclusion of a carboxylic acid into the polymer structure of the OH-PUD, for example by the urethane reaction of dimethylol propionic acid ('DMPA'). Once DMPA or any other acid-containing species is incorporated into the OH-PUD backbone, it may then be neutralized with any organic or inorganic base to enable the anionic stabilizing mechanism.

Non-ionically stabilized OH-PUDs typically comprise a hydrophilic segment in the polyurethane (for example, poly (ethylene oxide)) to enable aqueous dispersion.

Dispersion of OH-PUDs may also be promoted by the use of anionic and non-ionic surfactants.

OH-PUDs suitable for use with the present invention include aromatic and aliphatic OH-PUDs, as well as OH-PUDs produced from polyether diols, polyester diols, polyacrylic diols and polycarbonate diols, or any blend or hybrid thereof.

The OH-PUDs for use in the present invention have acid values of less than 100 mgKOH/g, such as preferably less than 50 mgKOH/g, and more preferably less than 40 mgKOH/g. The OH-PUDs for use in the present invention preferably have acid values between 20 and 40 mgKOH/g.

PUDs

The PUD for use in the invention has a hydroxyl value of less than 25 mgKOH/g, preferably less than 20 mgKOH/g, such as less than 15 mgKOH/g, less than 10 mgKOH/g, and more preferably less than 5 mgKOH/g.

The second PUD for use in the invention may be produced from polyether diols, polyester diols, polyacrylic diols and polycarbonate diols or any blend or hybrid thereof. The polyisocyanates used in the manufacture of the polyurethane backbone may be aromatic or aliphatic.

The second PUD component can be selected from any of an anionically stabilized non-crosslinkable PUD; a non-ionically stabilized PUD; or a self-crosslinking PUD. In the latter case, self-crosslinking PUDs can include those that crosslink via a keto-amine or silane crosslinking chemistry. The PUD may be anionic or non-ionic in terms of its stabilization, or a combination of the two stabilization mechanisms.

Anionic PUDs are commonly produced by the inclusion of a carboxylic acid into the polymer structure of the PUD, for example by the urethane reaction of dimethylol propionic acid ('DMPA'). Where DMPA, or other acid-containing species, is incorporated into the PUD backbone then it may be neutralized with any organic or inorganic base to enable the anionic stabilizing mechanism. Where such PUDs containing acid groups are prepared there is no restriction on the acid value of the PUD. The acid value of the PUD may be between 0 and 100 mgKOH/g, based on the dry polymer weight of the PUD. There is no limitation on the molecular weight of the PUD, and it may be, for example, between 5,000 and 200,000.

Self-Crosslinkable PUDs

The PUD for use in the invention may optionally be selected from any of a self-crosslinking type and the self-crosslinking chemistry may be selected from, but not limited to; keto-hydrazide, keto-amine and silane. Using self-crosslinking PUDs as the second component of the resin binder system of the present invention allows crosslinkable inks to be prepared. The present invention overcomes issues in the art related to the use of conventional PUDs, or crosslinked PUDs, using crosslinkers such as amino resins, carbodiimides, and the like, which reduce ink resolubility/redispersibility. While undergoing cross-linking themselves, self-crosslinking PUDs can provide resoluble/redispersible inks. Without wishing to be bound by theory, it is postulated that as the crosslinking reaction for self-crosslinking PUDs depends on some form of initiation, it does not occur immediately upon printing but is delayed, for example, until the water solvent has evaporated. For example, in keto-hydrazide chemistry, the crosslinking reaction is delayed by the presence of water and a base, such as the slow-evaporating amine N,N'-dimethylethanolamine. This delay in the crosslinking reaction means that the printed ink is still resoluble.

Any self-crosslinking chemistry can be used with the self-crosslinking PUDs for use with the present invention, including the well-known keto-dihydrazide and keto-amine chemistries, the crosslinking of polymers comprising carboxylic acid or carbonyl groups with metal complex crosslinking agents, and the self-condensation of polymers comprising organosilane functionality. The examples demonstrate how self-crosslinking PUDs using keto-amine/hydrazide and silane self-crosslinking chemistries can be incorporated into the compositions of the present invention. Although there is no particular restriction on the type of crosslinking chemistry of these self-crosslinking PUDs, crosslinking by keto-amine (often referred to as the keto-hydrazide self-crosslinking chemistry) and silane condensation are preferred.

Self-crosslinking chemistries are commonly introduced into the PUD backbone by using reagents bearing the desired functionality. For example, ketone groups may be introduced into the PUD backbone by using a diol in the PUD manufacture that comprises a ketone group. For example, this may be achieved by reacting a ketone-functional acid, such as levulinic acid, with a diepoxide to produce the desired ketone diol. Other approaches include the reaction of diacetone acrylamide with an alkanolamine such as diethanolamine. It should be understood that it is not critical to the invention how the ketone group is introduced other than that it is available for reaction with a suitable crosslinking reagent such as a dihydrazide or diamine.

Typical water-soluble multifunctional reagents that can crosslink the ketone groups of the PUD backbone include, but are not limited to; adipic dihydrazide, pimelic acid dihydrazide, other dihydrazides derived from a difunctional acid, and aliphatic di-, tri and higher functional amines.

Aliphatic di-, tri and higher functional amines include polyethylene oxide comprising polyfunctional amines, such as those supplied by Huntsman under the brand name 'Jeffamine'. It is also possible to crosslink ketone-containing PUDs using a polymer dispersion that comprises as part of its structure either primary or secondary amines.

The ketone groups of such crosslinkable PUDs may also be crosslinked using metal complexes, such as zirconium ammonium carbonate ('AZC'). Such metal complexes, present in the aqueous phase of the polymer dispersion can react after the ink has been printed and dried, with carboxylic acid and carbonyl groups present in the PUD backbone. This has already been achieved for acrylic dispersions, as revealed in U.S. Pat. No. 7,947,760, wherein long shelf-life of the compositions, which can be an issue when using AZC, was achieved by using a stabilizer such as ammonium tartrate. The use of AZC in self-crosslinking PUDs forms part of the present invention and the examples demonstrate how addition of AZC to an ink comprising an OH-PUD and a PUD according to the invention has enhanced print resistance properties.

Crosslinkable PUDs comprising silane groups, such as the Takelac WS range supplied by Mitsui Chemicals, and used in the inventive examples, comprise a reactive silane group in the polyurethane backbone. There is no restriction on how such a PUD is prepared. In one exemplary method, a reactive silane reagent such as 3-aminopropyltri-ethoxysilane, is used in the preparation of the self-crosslinking PUD comprising silane groups.

Amounts

There is no restriction on the ratio of the OH-PUD to PUD, but it should preferably be in the range, based on dry polymer weight, of 20:1 to 1:10, and more preferably in the range 15:1 to 1:5. The ratio of the OH-PUD to the second PUD and may be between 10:1 and 1:10, based on the dry polymer weights, such as preferably between 8:2 to 2:8, or between 1:5 and 10:1, such as between 1:1 and 10:1, more preferably between 2:1 and 8:1, such as 2:1 to 6:1.

It is preferred that the total solids content contributed to the ink or coating composition of the invention, such as an aqueous inkjet printing ink composition, by the combination of the first OH-PUD and the second PUD is in the range 2.5% (w/w) to 30% (w/w), and more preferably in the range 5.0% (w/w) to 20.0% (w/w) of the final ink composition, based on the dry polymer weight, such as in the range 8% (w/w) to 15% (w/w), and more preferably between 8% (w/w) and 12% (w/w), such as 9% (w/w) and 12% (w/w).

It is preferred that the total solids content contributed to the ink or coating composition of the invention, such as an aqueous inkjet printing ink composition, by the first OH-PUD is in the range 1% (w/w) to 20% (w/w), and more preferably in the range 3.0% (w/w) to 15.0% (w/w) of the final ink composition, based on the dry polymer weight, such as in the range 5% (w/w) to 12% (w/w), and more preferably between 6% (w/w) and 10% (w/w).

It is preferred that the total solids content contributed to the ink or coating composition of the invention, such as an aqueous inkjet printing ink composition, by the second PUD is in the range 0.5% (w/w) to 15% (w/w), and more preferably in the range 1.0% (w/w) to 10% (w/w) of the final ink composition, based on the dry polymer weight, such as in the range 2% (w/w) to 8% (w/w), and more preferably between 2% (w/w) and 4% (w/w).

Ink Properties

The ink or coating compositions of the invention, such as an aqueous inkjet printing ink, preferably have viscosities at 32° C. of less than 10.0 mPa·s. The pH of the inks and coatings of the invention are preferably in the range 5.0 to 10.0 and more preferably in the range 6.0 to 9.5, such as in the range 7 to 9, or 8 to 9.

Although it is possible to prepare inks on PUDs, of low hydroxyl value, having acceptable resolubility/redispersibility for applications such as flexographic printing (where it is sufficient to be able to remove any drying ink from a printing cylinder by mechanical cleaning) the inventor has found that such low hydroxyl value PUDs have potentially unacceptable resolubility/redispersibility for inkjet printing applications especially, as shown by way of the examples, when inks are dried at temperatures in excess of 30° C.

The invention overcomes the poor resolubility of such conventional low hydroxyl value PUDs through the inclusion of OH-PUDs having hydroxyl values of greater than 25 mgKOH/g. Such hydroxyl-functional PUDs have excellent resolubility, but a consequence of this is that the water resistance of prints prepared with inks comprising them as the sole resin binder can be deficient. Thus, by combining PUDs having hydroxyl values of less than 25 mgKOH/g with OH-PUDs having hydroxyl values of 25 mgKOH/g or greater, and preferably 50 mgKOH/g or greater, according to the invention, it is possible to produce aqueous printing inks that have both acceptable resolubility and print performance (in terms of water resistance) once the inks have dried and cured.

Optional Crosslinkers

While the addition of a crosslinking species is not required in order to provide the advantageous combination of properties provided by the present invention, the inks and coatings of the invention may nevertheless optionally comprise an additional crosslinker to further enhance the cure of the inks. The crosslinkers for use in the inks or coatings of the invention include but are not limited to those comprising the following reactive species: carbodiimides, oxazolines, polyoxazolines, azriridines, polyaziridines, epoxies, amino resins (such as melamine-formaldehhydes), metal complexes (including titanate and zirconate organometallics, such as ammonium zirconium carbonate), isocyanates (including blocked isocyanates), and silanes.

The inks and coatings of the invention may optionally comprise crosslinkers such as polycarbodiimides to further enhance the cure of the inks. Polycarbodiimides are a preferred class of optional additional crosslinker.

When crosslinkers are added to the inventive compositions, it may negatively impact ink resolubility and may also cause issues with migration, making the inks unsuitable for sensitive applications.

Other Resins

The inks and coatings of the invention may also comprise further water-soluble or water-dispersible resins, other than the OH-PUD and PUD. Such additional resins include, but are not limited to; solution acrylics, acrylic dispersions, self-crosslinking acrylic dispersions, polyester dispersions, poly(vinyl acetate) and copolymers of vinyl acetate dispersions, poly(vinyl alcohols), poly(vinyl pyrrolidones). It should be understood that the person skilled in the art could modify the inks of the invention through the addition of additional resins and such modifications form part of the invention.

There is no restriction on the total amount of resin binder that can be used in inks of the invention, but may be in the range 2.5% (w/w) to 40.0% (w/w), more preferably in the range 5.0% (w/w) to 30.0% (w/w) and most preferably, especially for aqueous inkjet printing inks in the range 5.0% to 20.0% (w/w) of the total ink composition, based on the dry combined weight of the OH-PUD, PUD and any other resin.

Amines

It has been found that the resolubility of the inks and coatings of the invention can be further enhanced by incorporating amines having boiling points≥130° C. If amines with boiling points≥250° C. are used, such as triethanolamine, improved ink resolubility is achieved, but the cure of the printed inks can be adversely affected. Where amines with boiling points of <250° C. are used, such as N,N'-dimethylethanolamine, N-methylethanolamine, 2-amino-2-methyl-1-propanol and N-methyldiethanolamine, the resolubility is enhanced and the cure of dried prints develops more rapidly than comparative compositions comprising amines with boiling points≥250° C., such as triethanolamine.

Accordingly, the inks or coatings of the invention may comprise an amine, wherein the amines for use in the inks or coatings of the invention preferably having a boiling point above 130° C., such as above 150° C. The amines for use in the inks or coatings of the invention preferably having a boiling point below 250° C., such as below 200° C. The amines for use in the inks or coatings of the invention preferably having a boiling point between 130° C. and 250° C., such as between 150° C. and 250° C. Amines with boiling points of less than 250° C., and more preferably less than 200° C., are preferred as they not only promote the resolubility of inks of the invention but also do not impact the development of cure of prints to the same extent as higher boiling amines, such as triethanolamine with a boiling point of 335° C.

Non-limiting examples of amines having boiling points greater than 130° C. include; N,N-dimethylethanolamine, tripropylamine, N-methylethanolamine, 2-amino-2-methyl-1-propanol, ethanolamine, propanolamine, butanolamine, N-methyldiethanolamine, triethanolamine. For the printing of food packaging, those amines having specific migration limits of 50 ppb or greater are especially preferred.

The amines can be introduced to the inks or coatings of the invention either as an additive to the ink or coating or by using the amines in the neutralisation of the OH-PUDs and PUDs of the invention.

Aqueous Phase

The inks or coatings of the invention comprise PUDs dispersed in an aqueous phase. The inks or coatings of the invention preferably comprise between 5 and 90 wt % water, such as between 5 and 70 wt %, or 10 and 50 wt % water. The inks or coatings of the invention more preferably comprise between 10 and 30 wt % water, such as 15 to 25 wt % water.

Solvents

It is common practice in the art to use concentrations of ≥30% of co-solvents in aqueous inkjet compositions to provide the required resolubility. For example, incorporating involatile solvents (i.e. solvents having boiling points above 200° C., such as above 250° C.) in concentrations in excess of 35% (w/w) into inkjet inks of the art is a commonly used approach to not only to raise the viscosity of the ink but also ensure that the ink has acceptable resolubility. However, for faster speed printing, especially on impervious substrates, such high concentrations of co-solvents, and particularly high boiling point co-solvents, has a deleterious impact on the drying speed, causing slow drying times of the inks, which is undesirable for high throughput printing.

The inks and coatings of the invention comprising OH-PUD are highly resoluble without comprising concentrations of co-solvents having boiling points in excess of 200° C., and especially 250° C., such as glycerol and diethylene glycol, amongst others, of greater than 35.0% (w/w). The inks or coatings of the invention therefore preferably comprise less than 40% (w/w) of any co-solvent, such as less than 35% (w/w), and more preferably less than 30% (w/w), and most preferably 25% (w/w) or less. It is preferred that the co-solvents for use in the invention have a boiling point of less than 250° C., such as less than 200° C.

The examples of the invention demonstrate that OH-PUDs can be used to prepared resoluble inks where the total concentration of co-solvents, such as propylene glycol, is ≤30% (w/w) of the total ink composition.

It is preferred that solvents having boiling points≥200° C., such as glycerol, should be limited to less than 5% (w/w) of the total ink composition. The inks or coatings of the invention preferably comprise ≤30% of any solvent having boiling points of ≥150° C.

Where the inks or coatings of the invention comprise co-solvents, it is preferred that the cosolvents having a heat of vaporization of 500 J/g or greater, such as propylene glycol, are present in concentrations of ≤30%, and more preferably ≤25% of the ink composition.

Where any water-soluble organic solvent is incorporated into the inks or coatings of the invention, it is preferred that the solvent has a boiling point of less than 250° C., and more preferably less than 200° C. Where solvents with boiling points of greater than 200° C., such as greater than 250° C., are used, their concentration in the ink should preferably be less than 10.0% (w/w) and more preferably less than 5.0% (w/w). The total concentration of water-soluble organic solvents should preferably be less than 35.0% (w/w), and more preferably less than 30.0% (w/w) of the ink composition.

The printing inks of the invention may optionally comprise any water-soluble organic co-solvent, according to what has previously been described. Although volatile solvents such as ethanol, propanol and isopropanol may be used, where the inks are intended for inkjet printing, it is preferred that solvents use are not highly flammable or volatile. Examples of such solvents include a polyol, an alkylene glycol, an alkylene glycol ether or ether acetate type, with the following non-limiting examples: 4-hydroxy-4-methyl-2-pentanone, diethyelene glycol, diethylene glycol butyl ether, diethylene glycol ethyl ether, diethylene glycol methyl ether, diethylene glycol monoethyl ether acetate, diethylene glycol monopropyl ether, dipropylene glycol, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrrolidone, glycerol, propylene glycol, propylene glycol ethyl ether, propylene glycol ethyl ether acetate, propylene glycol methyl ether, propylene glycol n-propyl ether, triethylene glycol, triethylene glycol butyl ether, triethylene glycol methyl ether, tripropylene glycol, tripropylene glycol methyl ether, N-methyl pyrollidone, urea, and the like. As mentioned previously, it is preferred that where such co-solvents are used they should form less than 40% (w/w), preferably less than 35% (w/w) and more preferably less than 30.0% (w/w) of the ink composition.

Optional Additives

The inks or coatings of the present invention are primarily water-based. Therefore, it is preferred to include a biocide or anti-mold agent in the inks and coatings of the invention. Suitable examples include products based on, but not limited to, the following biocide structural types: benz-isothiazoli-none, bromo-nitro-propane-diol, isothiazolinone, ethylene-dioxydimethanol, or iodo-propynyl butyl carbamate. Some commercially available grades include those marketed under the trade names Intercide (Akcros Chemicals) or Nipacide (Clariant). Other types of biocide that could be incorporated include sodium dehydroacetate (Geogard 111S from Lonza), sodium benzoate (Vancide 51 from R. T. VANDERBILT), sodium pyridinethiol-1-oxide (Sodium Omadine from Arch Chemicals), sodium salt of o-phenylphenol (Dowicide A from DOW Chemical) and ethyl p-hydroxybenzoate (Nipastat Sodium from Aako). These are preferably used in an amount of 0.01 to 1.00% by mass relative to the total mass of the ink or coating composition.

Defoamers can also optionally be included in the inks or coating of the invention to prevent the formation of foam during manufacture of the ink or coating and while jetting. Defoamers are particularly important with recirculating printheads. Examples of suitable defoamers include, but are not limited to, TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from Evonik. Available from BYK are BYK-066N, 088, 055, 057, 1790, 020, BYK-A 530, 067A, and BYK 354. The additives DC62, DC65, DC 68, DC71 and DC74 are available from Dow Corning. Agitan 120, 150, 160, 271, 290, 298, 299, 350, 351, 731, 760, 761, and 777 are available from Munzing. Surfynol 104PA, AD01, DF-110, DF-58, DF-62, DF-66, DF-695, DF-70, and MD-20 are available from Air Products.

Surface control additives may be optionally added in order to control the surface tension of the ink or coating of the invention. Surface control additives may be required in order to adjust the wetting on the face plate of the printhead and also to give the desired drop spread on the substrate, or, in the case of multi pass inkjet printing, wet on dry drop spread. Surface control additives can also be used to control the level of slip and scratch resistance of the coating. Examples of suitable surface control additives include but are not limited to TEGO FLOW 300, 370, and 425, TEGO GLIDE 100, 110, 130, 406, 410, 411, 415, 420, 432, 435, 440, 482, A115, and B1484, TEGO GLIDE ZG 400, TEGO RAD 2010, 2011, 2100, 2200N, 2250, 2300, 2500, 2600, 2650, and 2700, TEGO TWIN 4000 and 4100, TEGO WET 240, 250, 260, 265, 270, 280, 500, 505, and 510 and TEGO WET KL245, all available from Evonik. Available from BYK are BYK 333 and 337, BYK UV 3500, BYK 378, 347 and 361, BYK UV 3530 and 3570, CERAFLOUR 998 and 996, NANOBYK 3601, 3610, and 3650, and CERMAT 258. Available from Cytec are EBECRYL 350 and 1360, MODA-FLOW 9200, and EBECRYL 341. From Sartomer the aliphatic silicone acrylate CN9800 may be used. Surfynol 104, 420, 440, 465, 485, 61, 82, and 2502 are available from Air Products. Multiwet BD, EF, SU, SO, and VE are available from Croda. Capstone FS-30, 31, 34, 35, 50, 51, 60, 61, 63, 64, 65, and 3100 are available from Du Pont.

The inks or coatings of the invention may optionally comprise a suitable de-aerator. De-aerators prevent the formation of air inclusions and pinholes in the cured coating. These also reduce rectified diffusion, which can cause reliability issues in the printhead. Non-limiting examples of such species include the following products available from Evonik: TEGO AIREX 900, 910, 916, 920, 931, 936, 940, 944, 945, 950, 962, 980, and 986.

Colorants and Pigments

The ink or coating compositions of the present invention may optionally contain one or more colorants, including pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

Commercial organic pigments classified according to Color Index International may be used, including, but not limited to, those according to the following trade designations: blue pigments PB1, PB15, PB15:1, PB15:2, PB15:3, PB15:4, PB15:6, PB16, PB60; brown pigments PB5, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments PBk1, PBk6, PBk7, PBk8, PBk9, PBk10, PBk11, PBk12, PBk13, PBk14, PBk17, PBk18, PBk19, PBk22, PBk23, PBk24, PBk25, PBk26, PBk27, PBk28, PBk29, PBk30, PBk31, PBk32, PBk33, PBk34, PBk35, NBk1, NBk2, NBk3, NBk4, NBk6; combinations thereof, and the like.

The pigments are milled to typically less than 1 micrometer, with a preferred particle size distribution of 10-500 nm, and more preferably 10-350 nm, in order to have better transparency and a wide color gamut.

In order to incorporate the above-described pigments to the compositions of the invention, it is preferable that the pigments are manufactured and stably stored as a pigment concentrate in water. This is typically achieved by dispersing the pigment into a water-soluble or water-dispersible resin using a water-soluble and/or a water-dispersible surfactant that introduces hydrophilic functional groups into the surface of the pigment particles. Examples of these dispersing resins are numerous and could include polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-alpha methyl styrene-acrylic acid copolymers, styrene-alpha methyl styrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, and vinyl acetate-acrylic acid copolymers, and the salts thereof. The copolymers can be used in any form of random copolymer, block copolymer, alternating copolymer and graft copolymer. Examples of such resins include Joncryl 67, 678, 8500, 586, 611, 680, 682, 683 and 69 available from BASF. These resins are commonly neutralized with ammonia to enable the preparation of polymer solutions. It is also possible to neutralize such resins with any other organic amine, or indeed an inorganic base.

Examples of surfactants used for the pigment dispersion include, but are not limited to, anionic surfactants such as alkane sulphonates, alpha-olefin sulphonates, alkyl benzene sulphonates, alkyl naphthalene sulphonates, acyl methyl taurinates, dialkyl sulfosuccinates, alkyl sulfates, sulfurized olefins, polyoxyethylene alkyl ether phosphates, polycarboxylic acids and mono glycerol phosphate, amphoteric surfactants such as alkylpyridinium salts and non-ionic surfactants such as polyoxyethylene alkyl ethers, polyoxyethylene alkyl phenyl ethers, polyoxyethylene alkyl esters, polyoxyethylene alkyl amides, glycerol alkyl esters and sorbitan alkyl esters. Examples include EFKA 1000, 4000, 5000 and 6000 series products from BASF, Tamol series products from Dow, and Solsperse 27,000, 40,000, 44,000, 46,000 and 47,000 from Lubrizol.

Curing

After printing and drying the inks or coatings of the invention, they can be cured either at room temperature or at elevated temperatures, for example ≥50° C. At ambient conditions, the cure of the inks or coatings of the invention can take a day or more after printing. However, the cure of the inks or coatings can be accelerated by heating the prints at temperatures of ≥50° C.

Method of Printing

The inks and coatings of the invention, having good resolubility allied with the capability of producing prints with excellent water resistance, can be used in a range of applications, including the printing of flexible packaging (surface print and reverse print); the printing of coated metal substrates (metal decoration, including metal can packaging; the printing of cartonboard packaging; and the printing of textiles and graphics printing. The excellent water resistance of prints obtained from the inks and coatings of the invention makes them suitable for surface print applications without the need of an overprint varnish. Furthermore, since resoluble/redispersible inks can be produced with concentrations of co-solvents, such as propylene glycol, of ≤25% of the composition, the inks of coatings of the invention can be used in high speed printing applications, such as multipass or single pass inkjet printing.

The inks and coatings of the invention are preferably printed via inkjet printing processes to print flexible packaging, cartonboard (and corrugated) packaging, metal packaging, textiles printing, décor printing and graphics printing. The inks of the invention can also be used in applications including the printing of rigid packaging (including metal decoration), cartonboard and paper packaging, the printing of décor laminates, textiles printing, and graphics printing. The inks and coatings of the invention can also be used to print packaging materials such as food packaging.

Although principally directed towards aqueous inkjet ink compositions the invention also lends itself to aqueous flexographic and gravure inks.

The inks and coatings of the invention may be printed onto any substrate, some of which may have been previously pre-coated with a suitable primer composition to enhance the print quality. Such primers typically comprise a multivalent metal salt that helps to 'fix' the ink, reducing print quality issues such as drop spread and intercolor bleed. Any suitable primer enhancing the print quality achievable with the inks or coatings of the invention may be used with the invention.

The inkjet compositions of the current invention are suitable for printing by either multipass or single-pass operations. Such printing applications include, but are not limited to, the multipass printing of textiles, including cotton-rich fabrics, the single-pass printing of textiles, the multipass printing of packaging, including cartonboard, the single pass printing of packaging, including corrugated, cartonboard and flexible packaging, the single pass and multipass printing of metal substrates including metal decoration of cans and décor printing.

Inkjet compositions prepared according to the invention are ideally suited to the multipass graphics printing market. For the graphics market, the inkjet compositions of the invention may be printed onto any flexible or rigid substrate including, but not limited to; paper, vinyl, acrylic, polystyrene, polycarbonate, metals, etc. The printing of inventive inkjet compositions may be preceded by the application of a print-receptive primer to the substrate to be printed. There is no restriction on the use of or type of primer coating, but those comprising a multivalent salt, such as calcium chloride, calcium acetate, magnesium chloride, magnesium acetate, aluminum sulphate, etc. are preferable. Such primers work with inkjet inks of the invention by helping to 'fix' the print design, reducing issues such as dot gain, line spread, inter-color bleed, mottle and graininess. Various types of primer and their use in the control of the print quality of pigmented aqueous inkjet printing inks are well known in the art. Therefore, the inkjet printing inks of the invention are preferably printed onto substrates which have been pre-coated with such primers.

The substrates to be printed, especially packaging substrates including polyester films, polypropylene films, nylon films, cellulose acetate films, polyethylene films, aluminum foils, metal sheets and rolls and any coated derivative thereof, may be further treated prior to printing via corona discharge or plasma treatments, to enhance the adhesion and print receptivity. Likewise, the printed material may be subject to further operations to realize a final product, including but not limited to, over-lacquering and lamination.

Numbered Paragraphs of the Invention

The invention is further described by the following numbered paragraphs:

1. Aqueous ink compositions comprising a first polyurethane dispersion having a hydroxy value of 25 mgKOH/g, or greater, and a second polyurethane dispersion having a hydroxy value of less than 25 mgKOH/g.
2. An ink composition according to paragraph 1 in which the first polyurethane dispersion has a hydroxy value of 50 mgKOH/g, or greater.
3. An ink composition according to paragraph 1 or 2 in which the second polyurethane dispersion component is a self-crosslinking type.
4. An ink composition according to any preceding paragraph, in which the second polyurethane dispersion comprises a ketone or aldehyde as part of its structure.

5. An ink composition according to any preceding paragraph, in which the second polyurethane dispersion comprises a silane groups as part of its structure.
6. An ink composition according to any previous paragraph which is suitable for printing via an inkjet printing process and has a viscosity of 10 mPa·s, or less, at 32° C.
7. An ink composition according to any preceding paragraph which contains less than 40% (w/w), preferably less than 35% (w/w) and most preferably less than 30% (w/w) of any blend of organic water-soluble co-solvents having boiling points of greater than 150° C.
8. An ink composition according to paragraph 7 which comprises less than 30% (w/w) of any blend of water-soluble organic solvents having heats of vaporization greater than 500 J/g.
9. An ink composition according to paragraph 8 which contains less than 10% (w/w) of a water-soluble organic co-solvent with a boiling point in excess of 200° C.
10. An ink composition according to any previous paragraph which further optionally comprises an amine with a boiling point of greater than 130° C.
11. An ink composition according to paragraph 10 in which the amine has a boiling point of less than 200° C.
12. An ink composition according to paragraph 11 in which the amine may be selected from any of N,N-dimethylethanolamine, N-methylethanolamine, N-methyldiethanolamine, 2-amino-2-methyl-1-propanol, ethanolamine.
13. An ink composition according to any previous paragraph which further comprises a crosslinker which is selected from the group consisting of carbodiimide, oxazoline, aziridine, amino resin, a blocked isocyanate and combinations thereof.
14. An ink composition according to any previous paragraph which may be used in the printing of packaging, including food packaging, the printing of metal substrates, the printing of textiles, the printing of décor laminates and the printing of graphics.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted to, limit the scope of the invention.

Materials

Daotan 6425: a polyurethane dispersion, with a solid content of around 40% and a hydroxyl value of about 55 mgKOH/g (ex. Allnex).

Daotan 7000: a polyurethane dispersion, with a solid content around 40% and hydroxyl value of about 170 mgKOH/g.

Daotan 6460: a polyurethane dispersion, with a solid content around 35% and hydroxyl value of about 30 mgKOH/g.

Neorez R605: a polyurethane dispersion, with a solid content around 33% and hydroxyl value of less than 5 mgKOH/g (ex. DSM Resins).

Daotan TW7064: A self-crosslinking, ketone-containing, polyurethane dispersion, with a solid content of around 40% (ex. Allnex) having a hydroxyl value of less than 5 mgKOH/g.

Takelac WS5000: A self-crosslinking, silane-containing, polyurethane dispersion, with a solid content of around 30% (ex. Mitsui Chemicals) having a hydroxyl value of less than 5 mgKOH/g.

Tegowet KL245: A surfactant (ex. Evonik)

Triethanolamine Propylene glycol: A water soluble co-solvent, with a boiling point of around 188° C. and a heat of vapourisation of around 880 J/g.

Cyan Pigment Dispersion: A proprietary dispersion of cyan 15:3 pigment, comprising about 16% (w/w) pigment.

Test Methods

Viscosity:

Viscosity is measured at 32° C. using a Brookfield DV-II+ Pro Viscometer equipped with Spindle no. 18, at 100 rpm.

Resolubility Testing:

Approximately 60 μm ink films were applied to glass slides using a No. 6 K-Bar applicator (ex. RK Print). The inks were then dried for 30 minutes at 40° C., before being immersed in an aqueous solution comprising 25% propylene glycol, 0.2% Tegowet KL245 and 0.2% of triethanolamine (this is referred to as 'Varnish 1'). Resolubility was assessed as; 'Highly Resoluble' (the dried ink film dispersed in the soaking fluid in less than 3 minutes, with no visible signs of any undissolved ink), 'Resoluble' (the dried ink film dispersed in the soaking fluid in 3 to 5 minutes, with no visible signs of any undissolved ink), 'Slowly Resoluble' (the dried ink film dispersed in the soaking fluid within 30 minutes, with no visible signs of any undissolved ink), 'Partially Resoluble' (the dried ink film disperses in the soaking fluid within 30 minutes, with visible signs of undissolved ink), 'Insoluble (the dried ink film shows little visible evidence of dispersing in the soaking fluid within 30 minutes).

Print Preparation:

The inks were applied to white polyester coated steel plates at 8 μm, using a K-Bar applicator (ex. RK Print). The prints were then dried for 30 seconds using a hot air blower. The prints were allowed to stand at room temperature for a further 15 minutes before being tested for solvent resistance. The prints were then heated for 2 minutes at 50, 75 and 100° C. and tested for solvent resistance. For a number of inks, a further set of prints were heated to 50° C. for 2 minutes before being allowed to stand at ambient conditions (22 to 25° C.) for one to seven days with the solvent resistance being assessed through this post-printing curing process.

Water Resistance:

The water resistance of the prints was determined by rubbing the print with a cotton wool bud soaked in water. The number of double rubs required to remove or disrupt the print was the recorded.

Table 1 shows the formulations and properties of a number of comparative ink examples comprising different individual PUDs.

TABLE 1

| Inkjet Ink Compositions Comprising Single PUDs | | | | | | |
| --- | --- | --- | --- | --- | --- | --- |
| Comparative Example # | C1 | C2 | C3 | C4 | C5 | C6 |
| Deionized Water (%) | 19.8 | 19.8 | 19.8 | 19.8 | 19.8 | 19.8 |
| Propylene Glycol (%) | 25.0 | 25.0 | 25.0 | 25.0 | 25.0 | 25.0 |
| Tegowet KL245 (%) | 0.2 | 0.2 | 0.2 | 0.2 | 0.2 | 0.2 |
| Daotan 7000 (%) | 30.0 | | | | | |
| Daotan 6425 (%) | | 30.0 | | | | |
| Daotan 6460 (%) | | | 30.0 | | | |
| Neorez R605 (%) | | | | 30.0 | | |
| Daotan TW7064 | | | | | 30.0 | |
| Takelac WS5000 | | | | | | 30.0 |
| Cyan Pigment Dispersion (%) | 25.0 | 25.0 | 25.0 | 25.0 | 25.0 | 25.0 |
| Total | 100 | 100 | 100 | 100 | 100 | 100 |
| Ink Properties | | | | | | |
| Viscosity at 32° C. (mPa · s) | 5.52 | 6.06 | 6.12 | 5.28 | 5.61 | 5.10 |
| pH | 8.75 | 8.15 | 7.95 | 8.55 | 8.45 | 7.90 |
| Ink Resolubility in 'Varnish 1' | 2-3 mins | 2-3 mins | Insoluble | Insoluble | Insoluble | 30 mins |
| Print Properties; Water Resistance (Double Rubs) | | | | | | |
| 15 minutes at room temperature | 1 | 1 | 90-100 | 90 | 100+ | 2 |
| 2 minutes at 50° C. | 2 | 20 | 100+ | 100+ | 100+ | 90 |
| 2 min. at 50° C., followed by 24 h. at room temp. | 20 | 40 | 100+ | 100+ | 100+ | 100+ |
| 2 minutes at 75° C. | 35 | 70 | 100+ | 100+ | 100+ | 100+ |
| 2 minutes at 100° C. | 50 | 90 | 100+ | 100+ | 100+ | 100+ |

The results in Table 1 show that OH-PUDs with hydroxyl values greater than 50 mgKOH/g (on dry polymer weight), Daotan 6425 and Daotan 7000, produce inks with excellent resolubility but with generally poor print water resistance. Conversely, the PUDs where the hydroxyl value is less than 50 mgKOH/g, including self-crosslinking types, produce inks with poor ink resolubility but with significantly superior print water resistance.

Table 2 shows the formulations and properties of a number of inventive ink examples comprising blends of OH-PUDs with hydroxyl values greater than 50 mgKOH/g with PUDs of low hydroxyl value.

TABLE 2

| Inventive Example # | I1 | I2 | I3 | I4 | I5 | I6 |
|---|---|---|---|---|---|---|
| Deionized Water (%) | 19.8 | 19.8 | 19.8 | 19.8 | 19.8 | 19.8 |
| Propylene Glycol (%) | 25.0 | 25.0 | 25.0 | 25.0 | 25.0 | 25.0 |
| Tegowet KL245 (%) | 0.2 | 0.2 | 0.2 | 0.2 | 0.2 | 0.2 |
| Daotan 7000 (%) | 20.0 | | | | | |
| Daotan 6425 (%) | | 20.0 | 25.0 | 20.0 | 25.0 | 20.0 |
| Neorez R605 (%) | 10.0 | 10.0 | 5.0 | | | |
| Daotan TW7064 | | | | 10.0 | 5.0 | |
| Takelac WS5000 | | | | | | 10.0 |
| Cyan Pigment Dispersion (%) | 25.0 | 25.0 | 25.0 | 25.0 | 25.0 | 25.0 |
| Total | 100 | 100 | 100 | 100 | 100 | 100 |
| Ink Properties | | | | | | |
| Viscosity at 32° C. (mPa · s) | 5.64 | 5.73 | 5.61 | 5.67 | 5.76 | 5.52 |
| pH | 8.45 | 8.25 | 8.15 | 8.10 | 8.10 | 8.05 |
| Ink Resolubility in 'Varnish 1' | 3 mins | 3 mins | 2-3 mins | 3 mins | 2-3 mins | 2-3 mins |
| Print Properties; Water Resistance (Double Rubs) | | | | | | |
| 15 minutes at room temperature | 2 | 5 | 3 | 2 | 2 | 2 |
| 2 minutes at 50° C. | 60 | 70 | 35 | 30 | 30 | 80 |
| 2 minutes at 50° C., followed by 24 h. at room temperature | 100+ | 100+ | 100+ | 100+ | 80 | 100+ |
| 2 minutes at 75° C. | 100+ | 100+ | 100+ | 100+ | 100+ | 100+ |
| 2 minutes at 100° C. | 100+ | 100+ | 100+ | 100+ | 100+ | 100+ |

Inventive Ink Examples showing the Benefit of Blending High and Low Hydroxyl value PUDs The results in Table 2 show how it is possible to prepare inks according to the invention having a good balance of ink resolubility and print performance by blending hydroxy-functional PUDs having hydroxyl values greater than 50 mgKOH/g (on dry polymer weight) with PUDs having lower hydroxyl values. The results provided in Table 2 also show how the invention can be applied to self-crosslinking PUDs (Inventive Examples 4, 5 and 6).

The invention claimed is:

1. An aqueous ink or coating composition comprising a first hydroxyl-functionalised polyurethane dispersion having a hydroxyl value of 25 mgKOH/g or greater, and a second polyurethane dispersion having a hydroxyl value of less than 25 mgKOH/g,
   wherein the ratio of the first hydroxyl-functionalised polyurethane dispersion to the second polyurethane dispersion, based on the dry polymer weight, is in the range 20:1 to 1:10.

2. The ink or coating composition of claim 1, wherein the first hydroxyl-functionalised polyurethane dispersion has a hydroxyl value of 50 mgKOH/g or greater, and/or the second polyurethane dispersion has a hydroxyl value of less than 10 mgKOH/g.

3. The ink or coating composition of claim 1, wherein the second polyurethane dispersion component is a self-crosslinking type and comprises a ketone, aldehyde, or silane group as part of its structure.

4. The ink or coating composition of claim 1, wherein the total solids content of the first hydroxyl-functionalised polyurethane dispersion in the ink or coating composition is in the range 1% (w/w) to 20% (w/w) based on the total weight of the composition, and wherein the total solids content of the second polyurethane dispersion in the ink or coating composition is in the range 0.5% (w/w) to 15% (w/w) based on the total weight of the composition.

5. The ink or coating composition of claim 1, which is suitable for printing via an inkjet printing process and has a viscosity of 10 mPa·s or less at 32° C. and a pH in the range of 5.0 to 10.0.

6. The ink or coating composition of claim 1, comprising one or more water-soluble co-solvents.

7. The ink or coating composition of claim 1, comprising less than 40% (w/w) of any blend of organic water-soluble co-solvents having boiling points of greater than 150° C. and comprising less than 10% (w/w) of any blend of water-soluble organic co-solvents with boiling points in excess of 200° C.

8. The ink or coating composition of claim 1, further comprising an amine with a boiling point of greater than 130° C. and less than 200° C.

9. The ink or coating composition of claim 8, wherein the amine is selected from the group consisting of N,N-dimethylethanolamine, N-methylethanol amine, N-methyldiethanolamine, 2-amino-2-methyl-1-propanol, ethanolamine, and combinations thereof.

10. The ink or coating composition of claim 1, further comprising a crosslinker selected from the group consisting of carbodiimide, oxazoline, aziridine, amino resin, a blocked isocyanate, and combinations thereof.

11. The ink or coating composition of claim 1, further comprising a colorant, wherein the colorant includes an organic or inorganic pigment selected from the group consisting of carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines and/or wherein the colorant includes a dye selected from the list consisting of azo dyes, anthraquinone dyes, xanthene dyes, azine dyes, and combinations thereof.

12. A substrate comprising a cured layer of the ink or coating of claim 1, wherein the substrate is selected from the group consisting of metal, packaging material; paper; carton board; a textile material, or a flexible plastic selected from the group consisting of vinyl, acrylic, polystyrene, polycarbonate, polyester, polypropylene, nylon, cellulose acetate, and polyethylene.

13. A printed article comprising the substrate of claim 12.

14. The printed article of claim 13, further comprising a primer layer between the substrate and the cured layer of the ink or coating, wherein the primer comprises a multivalent salt.

15. A method of making the ink or coating composition of claim 1 comprising the steps of combining a first hydroxyl-functionalised polyurethane dispersion having a hydroxyl value of 25 mgKOH/g or greater, with a second polyurethane dispersion having a hydroxyl value of less than 25 mgKOH/g to provide the composition.

16. The method of claim 15, further comprising the step of adding an amine with a boiling point of greater than 130° C. to the composition wherein the first hydroxyl-functionalised polyurethane dispersion and/or the second polyurethane dispersion is/are anionically stabilized and the amine is added to neutralize the first hydroxyl-functionalised polyurethane dispersion and/or the second polyurethane dispersion prior to combining the first hydroxyl-functionalised polyurethane dispersion with the second polyurethane dispersion.

17. A method of printing, comprising the steps of: a) providing the composition according to claim 1; and b) printing said composition onto a substrate; wherein the method of printing is selected from the group consisting of flexographic printing, gravure printing, inkjet printing, and screen printing.

18. The method of claim 17, further comprising: step c) curing the printed composition; wherein step c) is performed after steps a) and b), and wherein step c) is performed at a temperature of 50° C. or greater.

19. The method of claim 17, wherein before step a), the substrate is coated with a primer layer, wherein the primer comprises a multivalent salt.

20. The method of claim 19, wherein the multivalent salt comprises, calcium chloride, calcium acetate, magnesium chloride, magnesium acetate, or aluminum sulphate.

21. The method of claim 17, further comprising: step d) treating the printed and cured composition with one of more further treatment steps selected from corona discharge, plasma treatment, over-lacquering, and/or lamination; wherein step d) is performed after steps a) to c).

22. A method of resolubilizing a layer comprising an ink or coating composition, the method comprising the steps of a) providing a substrate comprising a layer of the composition according to claim 1; b) resolubilizing the layer, wherein step b) is performed using a suitable flushing solution.

23. The method according to claim 17, wherein the method is for the printing of packaging, the printing of metal substrates, the printing of textiles, the printing of décor laminates, or the printing of graphics.

24. The method of claim 14, wherein the multivalent salt comprises calcium chloride, calcium acetate, magnesium chloride, magnesium acetate, or aluminum sulphate.

* * * * *